Inventors:
Eugene Behun,
Ray E. Cronkwright,
Jerry D. Griffith,
Kenneth F. Moore
Robert E. Stalcup
by Gust & Irish
Attorneys.

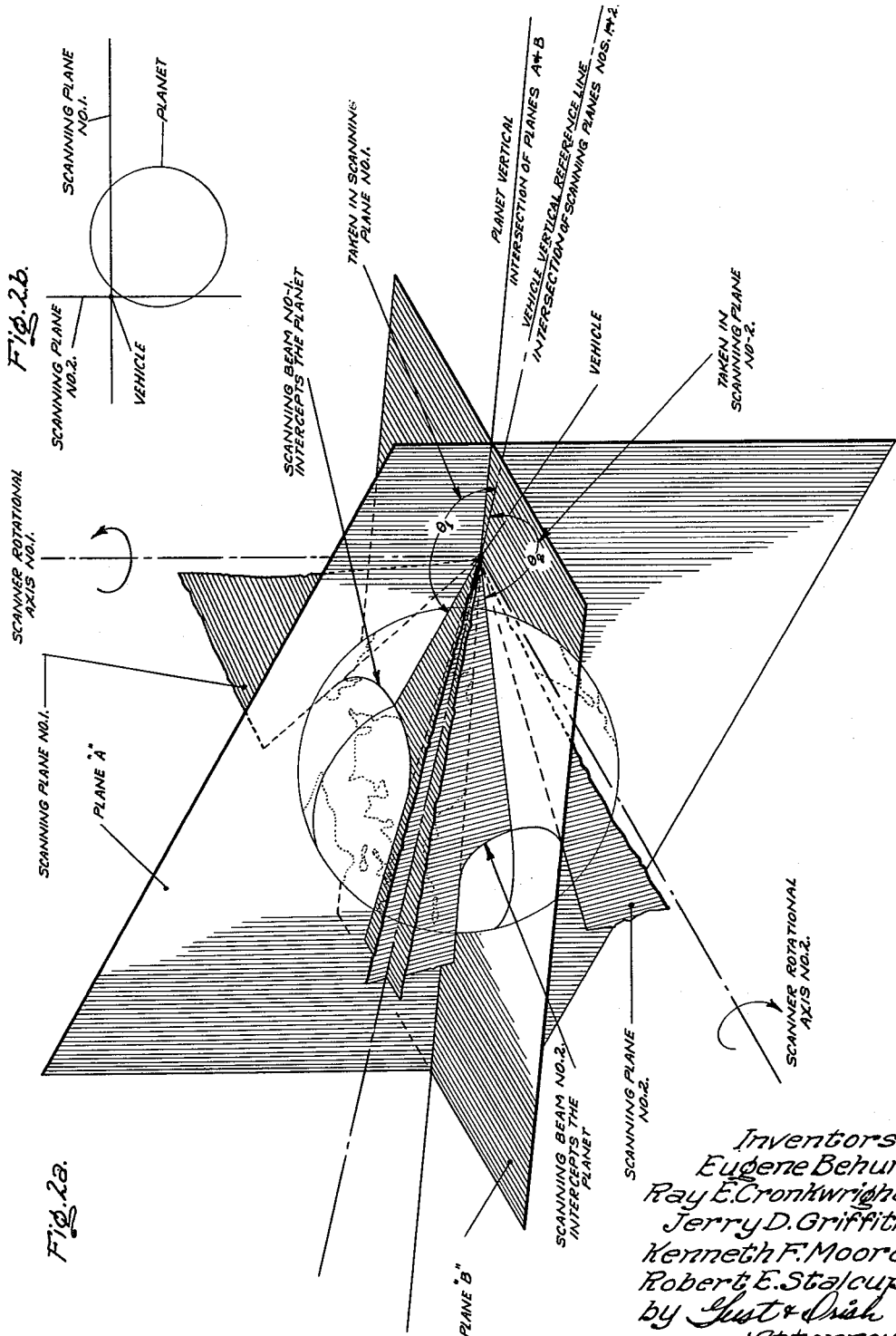

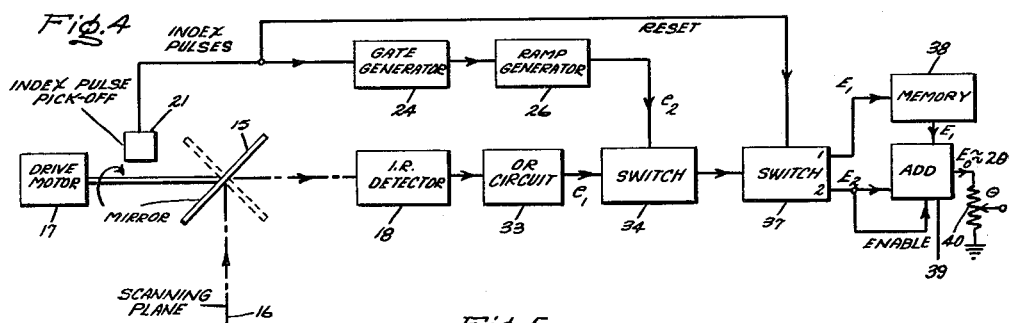
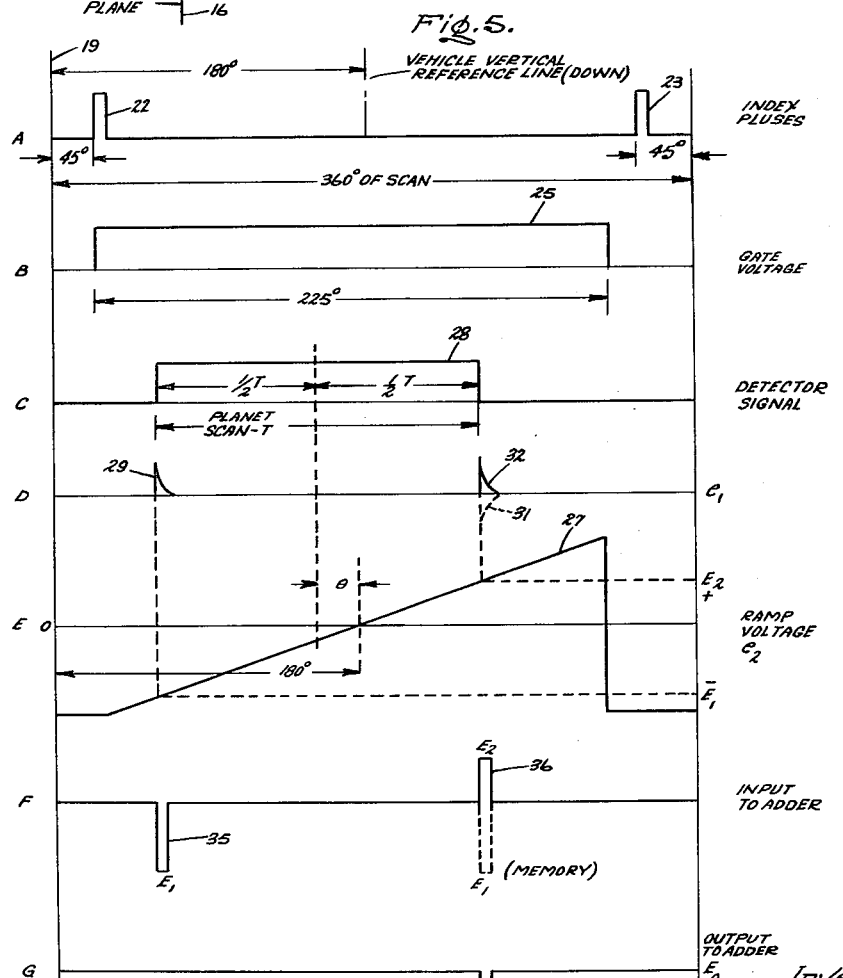

Inventors:
Eugene Behun,
Ray E. Cronkwright,
Jerry D. Griffith,
Kenneth F. Moore,
Robert E. Stalcup,
by *Gust & Dish*
Attorneys.

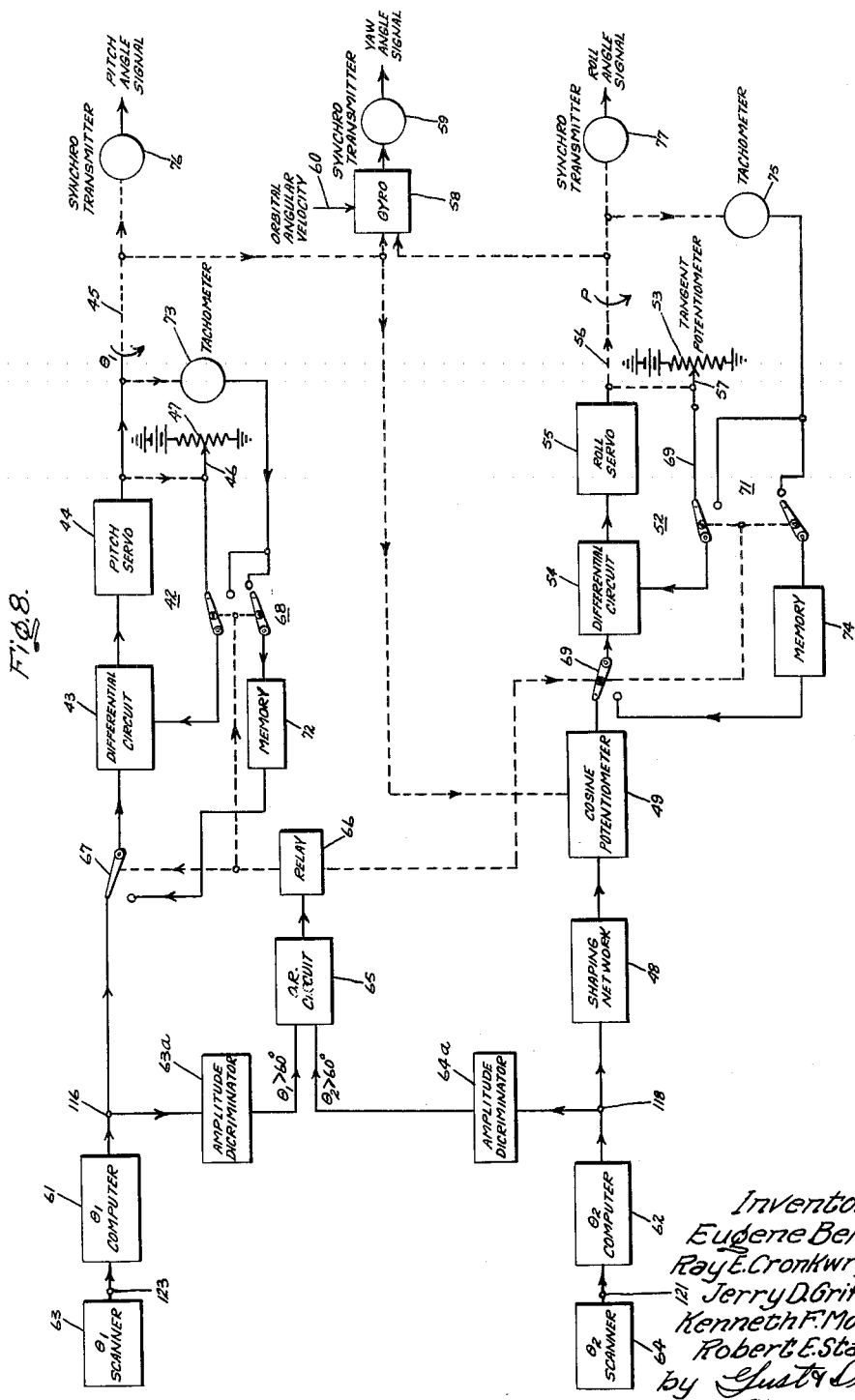

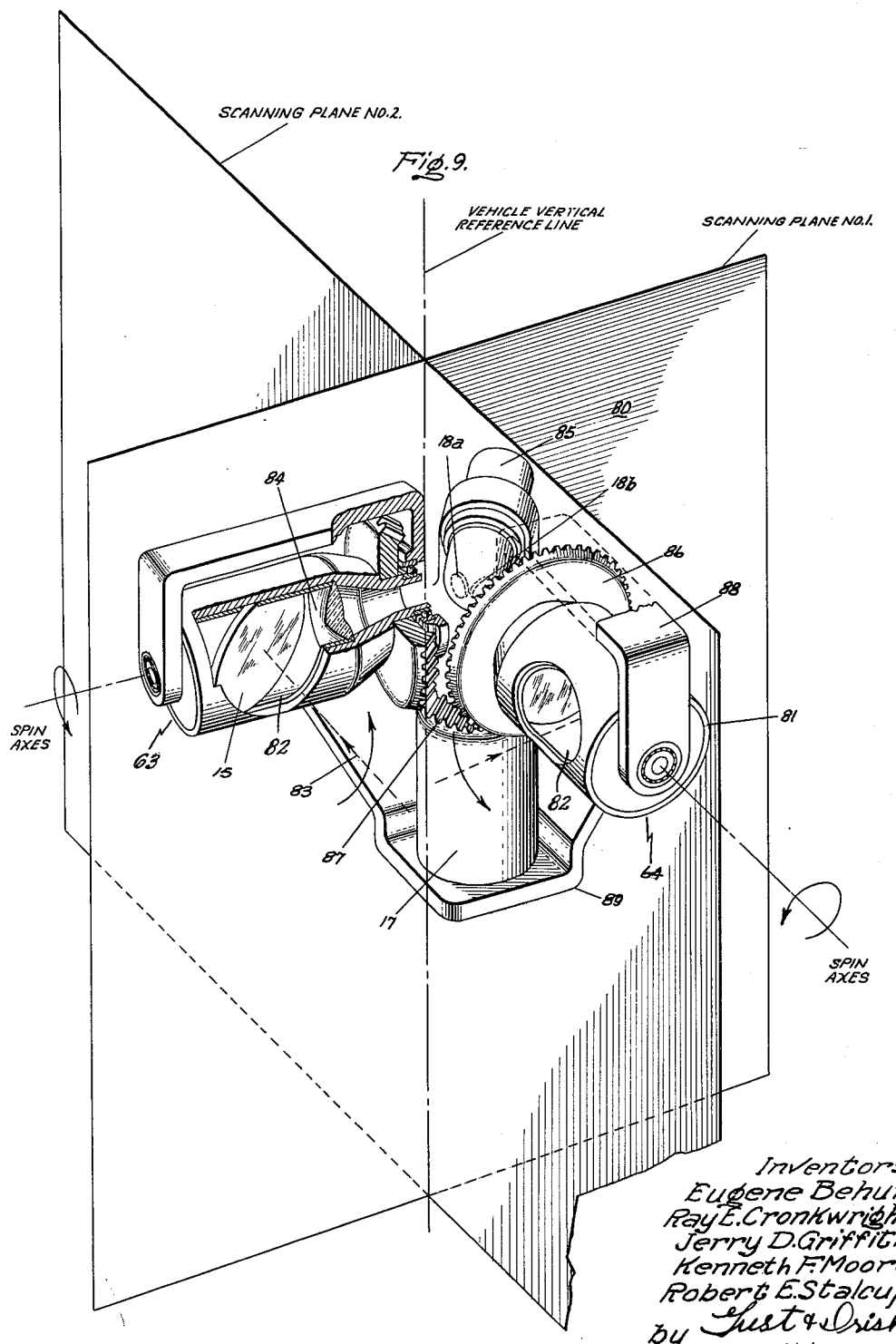

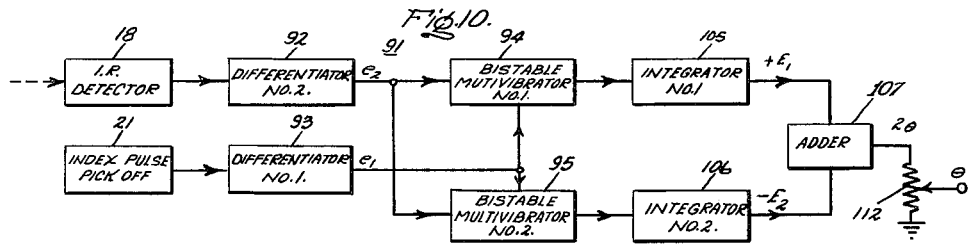
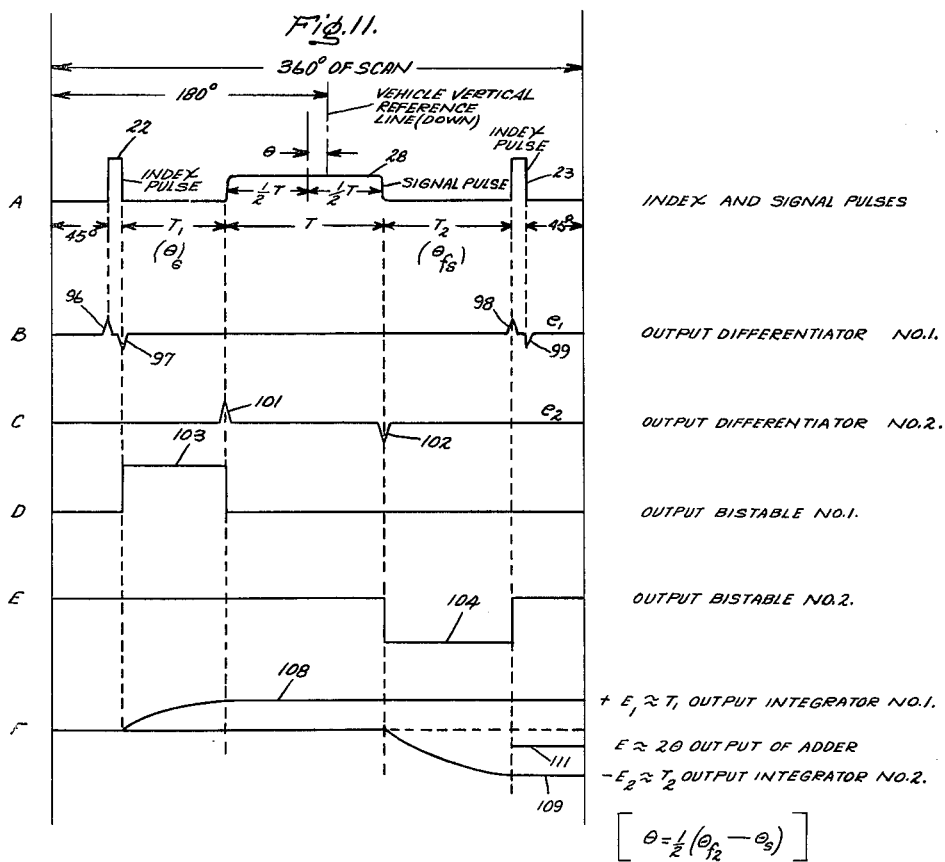

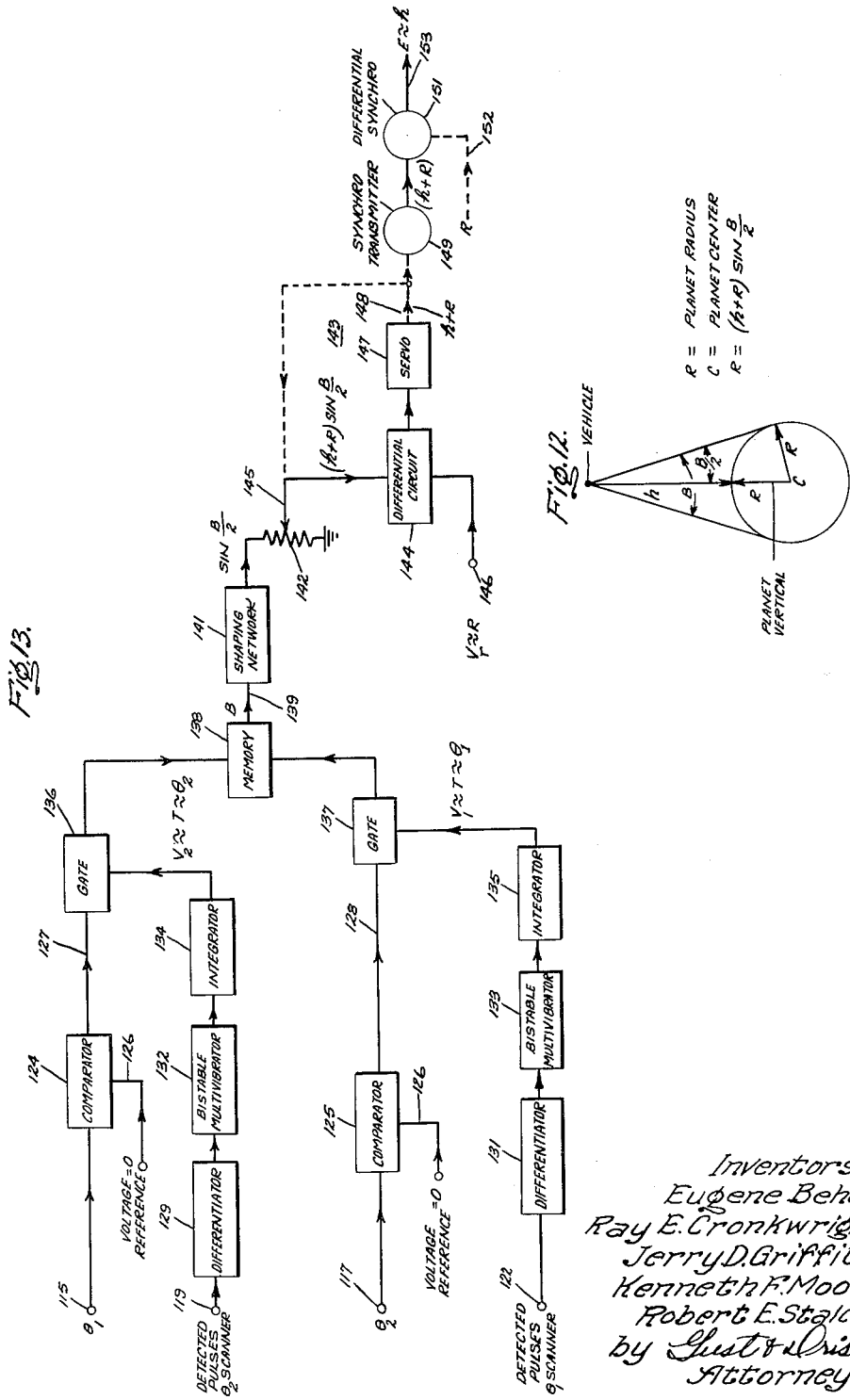

United States Patent Office 3,090,583
Patented May 21, 1963

3,090,583
SYSTEM AND METHOD FOR DETERMINING THE ATTITUDE OF A SPACE VEHICLE
Eugene Behun and Ray E. Cronkwright, Fort Wayne, Ind., Jerry D. Griffith, Alexandria, Va., Kenneth F. Moore, Marathon Shores, Fla., and Robert E. Stalcup, Champaign, Ill., assignors to International Telephone and Telegraph Corporation
Filed Feb. 8, 1960, Ser. No. 7,432
27 Claims. (Cl. 244—14)

This invention relates to a system and method for determining the attitude of a space vehicle with reference to a line extending from the center of a celestial body, such as the earth, to the vehicle.

In the design of space vehicles, such as earth satellites, it is desirable to provide means for determining the orientation or attitude of the vehicle with reference to the vertical line extending from the earth to the vehicle; this attitude information is desirable not only for purposes of correcting the attitude of the vehicle, but also for such purposes as controlling photographic and radio transmitting apparatus so that it is continually aimed at the earth or effective only when the earth is within its field of view, or for providing earth direction reference for the correlation and reduction of data received by other means. The problem of attitude determination is complicated by the fact that the vehicle may not only be tumbling as it orbits in space, but further by the fact that a spinning motion may have been applied to the vehicle at the time of launching in order to provide stabilization and to insure a uniform thrust direction. In the case of a manned satellite, such spin may be undesirable, or on the other hand, it may be desirable to provide spinning at a predetermined controlled rate. It is therefore desirable that an attitude reference system be operative for both spinning and non-spinning vehicles. In addition, it must be contemplated that space vehicles, the attitude of which it is desired to determine, will be operating at distances far beyond the practical limit of operation of active radar which might be contained in the vehicle. It is also desirable that the system be considerably more compact and require less power for operation than even radars designed to operate over a relatively short range, and thus, such an attitude reference system should be passive in character, rather than active, as in the case of conventional radar systems. The foregoing factors indicate that a satisfactory attitude reference system and method should be operated from radiation from the target body, such as, for example, from infra-red radiation, which thus permits operation of the system at much longer ranges with greatly reduced weight and power requirements and which further substantially eliminates errors due to terrain irregularities and atmospheric conditions which adversely affect radar operation, particularly at low altitudes.

It is therefore desirable to provide a system and method for determining the attitude of a space vehicle with reference to a line extending vertically from the center of a planet or other celestial body to the vehicle.

Another object of our invention is to provide a system and method for measuring the roll, pitch and yaw parameters of a satellite vehicle with reference to a line extending from a planet vertically to the vehicle and with reference to the orbital plane of the vehicle.

We have, in accordance with the preferred embodiment of our invention, chosen to employ infra-red radiation rather than visible or ultra-violet radiation because of the large difference in signal strength between the sunlit and dark portions of the earth for the latter two types of radiations; by employing infra-red detectors sensitive to the proper frequency range, it is possible to further minimize the signal differences that exist for infra-red radiation. In addition, the infra-red signal received by a detector viewing a dark portion of the earth is considerably higher than that received when the detector is viewing open space. In accordance with our system and method for determining the attitude of a space vehicle, the earth or other planet is scanned from the vehicle in two mutually perpendicular planes, the line defined by the intersection of these planes being arbitrarily established as the vehicle vertical reference line. More particularly, scanning is accomplished by the use of two narrow infra-red search beams, with the center line of each beam rotating at constant angular velocity in a plane at right angles to the plane of the other scanning beam. Infra-red detection devices are provided responsive to the radiation received by the scanning means, and thus, when a scanning beam intercepts a planet, a step in the output signal level of the respective detector occurs. The time interval between half the width of each signal step and the instant the respective beam coincides with the vehicle vertical reference line is determined, thus in turn determining the angles between the vehicle vertical reference line and the midpoint of each planet scan. The line of each scanning beam midway through a planet scan falls in a plane passing the center of the planet, the two planes thus defined when both scanning beams intercept the earth being at right angles and extending along the line from the center of the planet to the vehicle. Therefore, the two angles thus ascertained provide all the information necessary to compute the roll, pitch and yaw of the vehicle with reference to the planet vertical line and the orbital plane.

The above-mentioned and other features and objects of this invention and the manner of attaining them will become more apparent and the invention itself will be best understood by reference to the following description of an embodiment of the invention taken in conjunction with the accompanying drawings, wherein:

FIGS. 2a and 2b are diagrams illustrating the basic method of our invention;

FIG. 4 is a schematic block diagram illustrating the system of our invention for providing the two attitude-determining angles;

FIG. 5 is a diagram illustrating the functioning of the system of FIG. 4;

FIG. 8 schematically illustrates the complete system of our invention which provides roll, pitch and yaw information;

FIG. 9 is a view in perspective, partly broken away, showing a scanner assembly which may be employed in our invention;

FIG. 10 is a schematic block diagram illustrating a modified system in accordance with our invention for providing the two attitude-determining angles;

FIG. 11 is a diagram illustrating the function of the system of FIG. 10;

FIG. 12 is a diagram illustrating the method of altitude determination in accordance with our invention; and FIG. 13 is a schematic diagram illustrating the additional portion of the system of our invention which provides altitude information.

Figure 1:
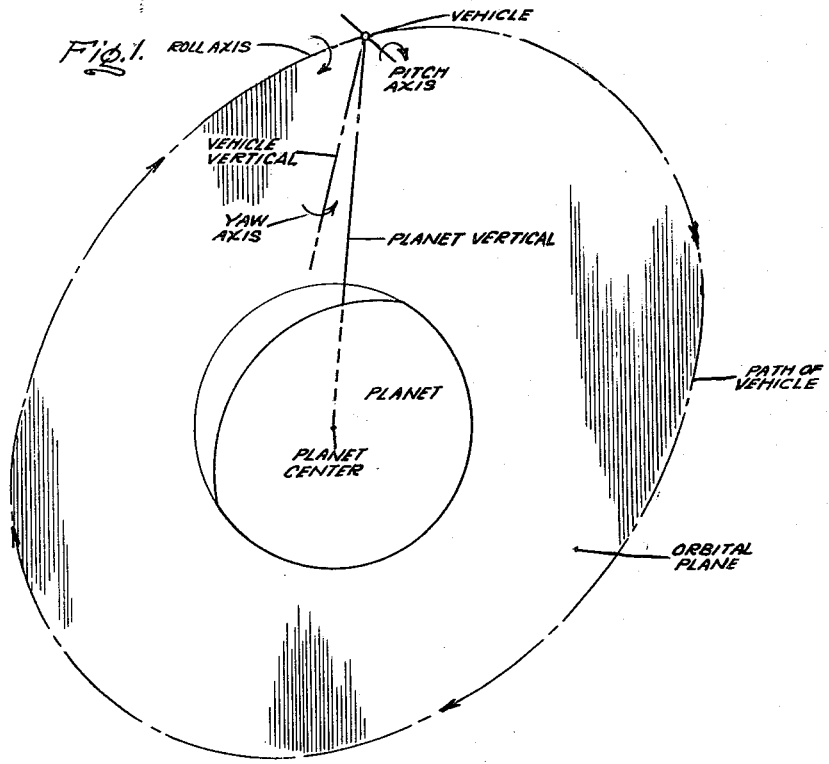
FIG. 1 is a diagram showing a satellite vehicle in orbit around a planet, illustrating the roll, pitch and yaw axes of the vehicle with reference to the planet vertical line, i.e., the line extending vertically from the center of the planet to the vehicle and the orbital plane.

Referring now briefly to FIG. 1, a space vehicle is schematically shown in orbit around a planet, the plane of motion of the vehicle being referred to as the orbital plane, and the line extending from the planet center vertically to the vehicle being referred to as the planet vertical. The vertical reference line of the vehicle, referred to as the vehicle vertical, would coincide with the planet vertical if the vehicle was properly oriented with respect to pitch and roll. The respective roll and pitch axes are thus shown in FIG. 1 disposed at right angles to each other and lying in a plane at right angles to the vehicle vertical, it being further seen that the yaw axis of the vehicle coincides with the vehicle vertical, e.g., the vehicle vertical may be perfectly aligned with the planet vertical and yet the vehicle may be out of alignment with its orbital plane, i.e., defining a yaw angle therewith.

Referring now to FIGS. 2a and 2b, as indicated hereinabove determination of the attitude of the vehicle is accomplished by scanning in two mutually perpendicular planes, identified as 1 and 2, by the use of two separate optical systems in the vehicle operating simultaneously, such as by the use of the scanning mechanism shown in FIG. 9 and to be described hereinafter. FIG. 2a is a view in perspective showing scanning of a planet from the vehicle in two mutually perpendicular planes, and FIG. 2b shows a view of the planet as observed by the scanner with the scanning planes being taken perpendicular to the plane of the paper. Inspection of FIG. 2a will readily reveal that the line defined by the intersection of the two scanning planes is the vehicle vertical reference line. In accordance with our invention, as will be described more fully hereinafter, each optical system comprises a rotating mirror which reflects the infra-red radiation through a suitable focusing system onto an infra-red detector cell; each mirror is continuously rotated, thus providing continuous scanning in its respective scanning plane.

Inspection of FIG. 2a will further reveal that when the planet vertical reference line is angularly displaced from the vehicle vertical reference line by no more than a certain amount, which depends upon the altitude of the vehicle, both scanning beams must pass across some portion of the planet surface. Thus, if the vehicle is at an altitude of .015 planet radii above the planet, i.e., 600 miles in the case of the earth, the angle which the planet subtends at the vehicle is 120°. Thus, in this case, it follows that when the planet vertical is angularly displaced from the vehicle vertical reference line by less than 60°, both scanning beams must intercept the planet. Further inspection of FIG. 2 will reveal that the lines defined by the two scanning beams when they are midway through their respective scans, fall respectively in planes identified as "A" and "B," these planes also being mutually perpendicular with the line defined by their intersection being the planet vertical. It will therefore now be perceived that the two angles identified as $\theta_1$ and $\theta_2$ respectively swept out from the vehicle vertical reference line to the lines defined by the two scanning beams at the midpoint of their respective scans determine the angular displacement of the vehicle vertical reference line from the planet vertical.

Figure 3:
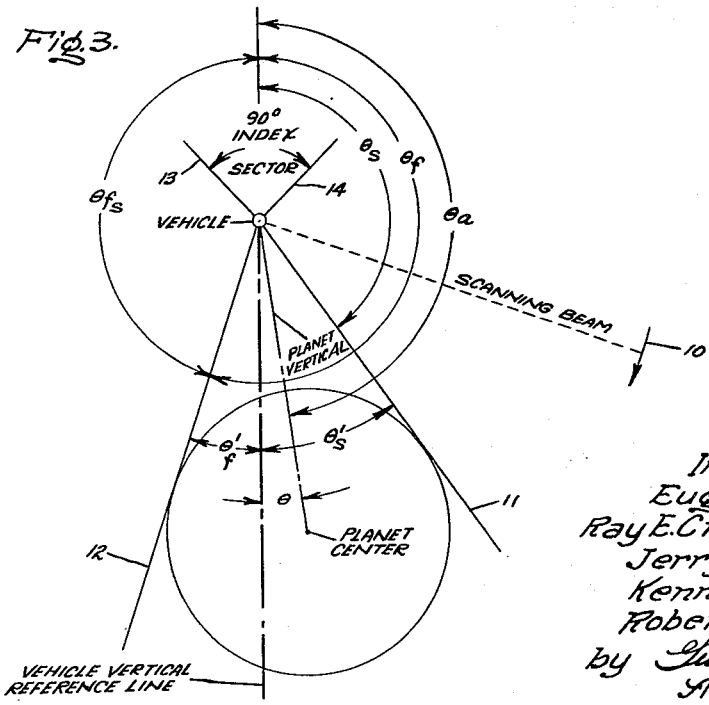
FIG. 3 is another diagram further illustrating the basic method of our invention.

It will now be readily comprehended that by measuring the time from the start of each scan to the initiation and termination respectively of the radiation received from the planet, the angular orientation of the vehicle vertical reference line with respect to the planet vertical can be ascertained. Referring now additionally to FIG. 3, which is viewed in one of the scanning planes, it is seen that the scanning beam continuously rotates from the vehicle in the direction shown by the arrow 10, the beam having a first line of tangency 11 with the planet when it first intercepts the planet, and a final line of tangency 12 when it finally departs from the planet. Thus, by a measurement of the time which the scanning beam 10 takes to move from the start of a scan at the vehicle vertical reference line to initial tangent line 11, and likewise by measuring the time which the beam takes to move from the vehicle vertical reference line to the final tangent line 12, the two angles $\theta_s$ and $\theta_f$ are determined with their difference being the angle through which the beam moves during the interception of the planet. It will now be readily seen that the angle $\theta_a$ is equal to $\frac{1}{2}(\theta_s+\theta_f)$, the angle $\theta_a$ being the angle measured from the vehicle vertical reference line looking up to the respective plane "A" or "B" which contains the planet vertical in the center of the earth. Since the scanner operates at constant angular velocity, angles $\theta_s$ and $\theta_f$ are proportional to the time required for the scanning beam to travel from the vehicle vertical reference line to the points of rise and fall respectively of the infra-red detector signal level. As will be more fully explained hereinafter, however, time measurement preferably is not started from the vehicle vertical reference line, but rather two index lines 13 and 14 are provided for a purpose to be hereinafter more fully described, these index lines in the illustrated embodiment being respectively disposed 45° on either side of the vehicle vertical reference line looking up, i.e., in the direction away from the planet.

Still referring to FIG. 3, the angle $\theta$ which is the supplement of the angle $\theta_a$, i.e., the angle measured from the vehicle vertical reference line looking down to the planet vertical is of greater interest than the angle $\theta_a$ since it can be used directly in the computing circuitry to be described hereinafter. While the angle $\theta$ could be readily derived from the angle $\theta_a$, it can be readily measured directly as shown. Thus, by inspection of FIG. 3, it is revealed that the angle $\theta_s'$ is the supplement of the angle $\theta_s$ while the angle $\theta_f'$ is the supplement of the angle $\theta_f$. Thus, it is seen that the angle $\theta$ is equal to $\frac{1}{2}(\theta_s'+\theta_f')$; it will be seen that one of the angles $\theta_s'$ and $\theta_f'$ will have a negative sign with respect to the other so that direct subtraction of the two angles $\theta_s'$ and $\theta_f'$ yields a quantity which is twice $\theta$. It is this method of determination of the angle $\theta$ which is employed in the embodiment of FIGS. 4 and 5 to be described hereinafter.

Inspection of FIG. 3 will further reveal that the angle $\theta_{fs}$ is the 360° supplement of the angle $\theta_f$. This being the case, it is apparent $\theta=\frac{1}{2}(\theta_{fs}-\theta_s)$. Thus, subtraction of the angle $\theta_s$ from the angle $\theta_{fs}$ yields a quantity which is twice the desired angle $\theta$; this method of determination of the angle $\theta$ is employed in the embodiment of FIGS. 10 and 11 described hereinafter.

Referring now additionally to FIGS. 4 and 5, there is shown one system and method by which each of the two angles $\theta_1$ and $\theta_2$ are determined. In FIG. 4 there is shown schematically a flat infra-red reflective scanning mirror 15 rotated in scanning plane 16 by a suitable drive motor 17, the mirror 15 reflecting the radiation received thereby onto a suitable infra-red detector 18. It will be readily understood that suitable optical filters and focusing lenses will be provided as is well known to those skilled in the art. A complete scanning cycle is initiated when the mirror 15 is scanning vertically upward along the vehicle vertical reference line, as indicated at 19 in FIG. 5. Suitable pick-ups 21, such as magnetic, are provided operatively associated with rotating mirror 15 and drive motor 17 to provide initial and final index pulses 22 and 23 respectively coincident with the index lines 13 and 14 of FIG. 3, i.e., 45° after the scanning beam departs from the vehicle vertical reference line looking up, and again 45° prior to the scanning beam again coinciding with the vehicle vertical reference line looking upward. The index pulse pick-off device 21 which provides the initial index pulse 22 is coupled to gate signal generator 24 which provides a gate pulse 25 responsive to the initial index pulse 22, gate signal generator 24 in the illustrated embodiment being arranged to provide a pulse having a duration corresponding to 225° of scan, i.e., the trailing edge of gate pulse 25 will occur 270° after initiation of the scanning cycle. Gate signal generator 24 is in turn coupled to ramp voltage generator 26 which provides a ramp voltage 27 having a duration coincident with the gate signal 25. The ramp generator 26 is arranged so that its voltage, which is identified as $e_2$ starts at a negative value corresponding to $-135°$ with respect to the vehicle vertical reference line, looking downward, i.e., 180° of scan past the start of the scanning cycle, and increases linearly to a positive value corresponding to $+135°$ with reference to the vehicle vertical reference line looking downward, the ramp voltage passing through zero at 180° of scan, i.e., when the scanning beam is coincident with the vehicle vertical reference line looking downward.

It will be readily seen that when the scanning beam intercepts a planet, there will be substantial increase in the received infra-red radiation, and thus that infra-red detector 18 will provide a stepped output signal 28 having a duration corresponding to the duration of planet interception by the scanning beam. The signal pulse 28 is differentiated as at 29 and 31 with the trailing differentiated pulse 31 being inverted as at 32. This may be simply accomplished by coupling the output of the infra-red detector 18 to an OR circuit 33. The pulses 29 and 32 which are coincident with the leading and trailing edges of the signal pulse 28 are identified as pulses $e_1$, these pulses being used to sample the ramp voltage 27. Inspection of FIG. 5C, D and E, will now reveal that the time interval between ½ the duration of signal pulse 28 and the vehicle vertical reference line is the desired angle $\theta$ and it will further readily be seen that if the ramp voltage coincident with the leading edge of signal pulse 28 and the ramp voltage coincident with the trailing edge of the signal pulse are algebraically added, the difference will be the ramp voltage at the instant of ½ the width of the signal pulse 28 which will thus be proportional to the desired angle $\theta$.

To accomplish the above described sampling, ramp generator 26 and OR circuit 33 are respectively connected to a suitable switch 34. Switch 34 is actuated or opened to pass ramp voltage $e_2$ by pulses 29 and 32, and thus it is seen that a sample 35 of the ramp voltage $e_2$ identified as $E_1$, is passed by switch 34 coincident with the leading edge of signal pulse 28 and likewise that another sample 36, identified as $E_2$ of the ramp voltage $e_2$ is passed by switch 34 coincident with the trailing edge of the signal pulse 28. It will now be readily seen that since the sampled voltages $E_1$ and $E_2$ do not occur in time coincidence, it will be necessary to memorize the sampled voltage $E_1$ in order that it may be added to the voltage $E_2$. To accomplish this, switch 34 is coupled to another switch 37. Switch 37 is arranged so that it normally couples switch 34 to memory circuit 38 and thus, the first sampled voltage pulse $E_1$ is read into the memory circuit 38, sampled voltage pulse $E_1$ also actuating switch 37 to move it from its first position to its second position, coupling switch 34 to adding circuit 39. The second sampled voltage pulse $E_2$ is then read into the adding circuit 39, the pulse $e_2$ also enabling the adder 39 which then adds the two sampled voltages $E_1$ and $E_2$ to provide a resulting output voltage pulse 41 identified as $E_0$, and it will be seen that the output voltage $E_0$ is thus directly proportional to twice the desired angle $\theta$. Potentiometer 40 is thus employed to obtain an output signal directly proportional to the angle $\theta$. In actual practice, adding circuit 39 is preferably made up of an analog summing network and a smoothing circuit, in order to convert the sampled signal 41 into a smooth direct current signal. The pick-off device providing the last index pulse 23 is also coupled to switch 37, the last index pulse 32 resetting the switch to its first position.

It will be readily understood that two $\theta$ angle computing circuits as shown in FIG. 4 will be provided, the two mirrors 15 being disposed to scan in mutually perpendicular planes, thereby providing output voltages directly proportional to the desired angles $\theta_1$ and $\theta_2$.

Figure 6:
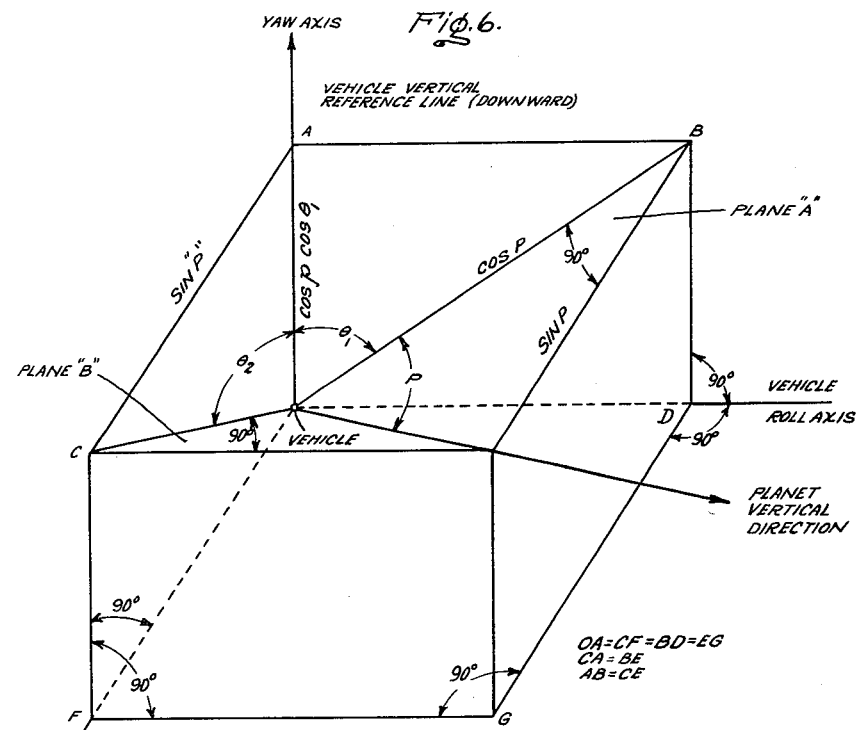
FIG. 6 is a diagram illustrating the solution of the problem of providing roll, pitch and yaw measurements from the two basic angles provided by our scanning system.

Referring now to FIG. 6, it will be seen that the two angles $\theta_1$ and $\theta_2$ define the orientation or attitude of the vehicle vertical reference line looking downward with respect to the planet vertical reference line. It will now be seen that the angle $\theta_1$ is measured in a plane containing the vehicle yaw and roll axis, and that the angle $\theta_2$ is measured in a plane containing the vehicle yaw and pitch axis. It will further be readily apparent that the two signals proportional to $\theta_1$ and $\theta_2$ may be transmitted to the planet and utilized there in order to compute the attitude of the vehicle. However, in accordance with our invention, the two signals respectively proportional to the angles $\theta_1$ and $\theta_2$ are employed in further circuitry in the vehicle which compute the roll, pitch and yaw angles of the vehicle.

It will be seen that the angle $\theta_1$ is the pitch angle and in accordance with the preferred embodiment of our invention, is employed directly as one output angle. It will further be comprehended by inspection of FIG. 6 that "p" is the roll angle of the vehicle. Further inspection of FIG. 6 will reveal that the relationship between $\theta_1$, $\theta_2$ and "p" is $\tan p = \tan \theta_2 \cdot \cos \theta_1$. This expression is derived from the construction shown in FIG. 6 in which the various line lengths are labeled in terms of measured angles $\theta_1$ and $\theta_2$, and the unknown angle "p." Line OE is assigned a value of unity in order to simplify the calculation. It will further be observed than $$\tan \theta_2 = \frac{CA}{OA}$$

Figure 7:
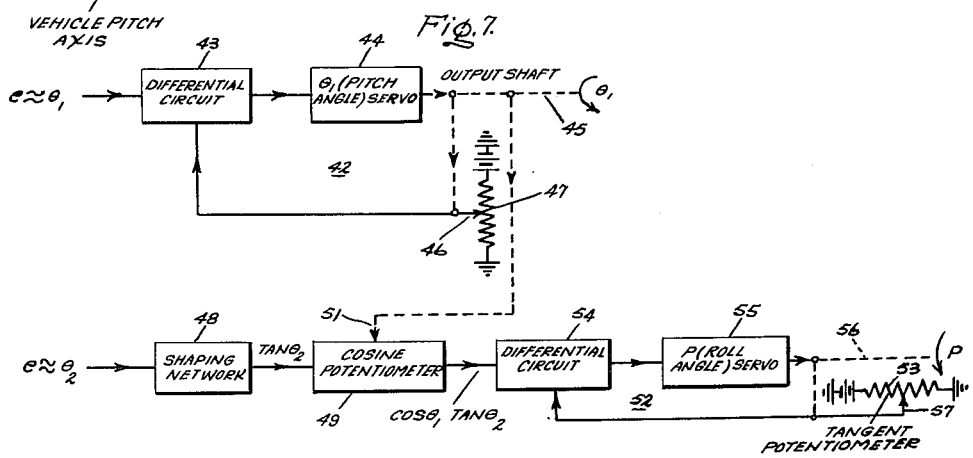
FIG. 7 illustrates the additional portion of the system of our invention which provides pitch and roll angles.

The computation $\tan p = \tan \theta_2 \cdot \cos \theta_1$ is performed by the system shown in FIG. 7. Here, a voltage proportional to the pitch angle $\theta_1$ is fed into servo loop 42 which provides an output shaft rotation equal to the angle $\theta_1$. Servo loop 42 is a conventional closed loop servo system in which the input voltage proportional to the angle $\theta_1$ is fed to differential circuit 43 which in turn energizes servo motor 44 having an output shaft shown in dashed lines at 45. As is well known in the art, the output shaft 45 of the servo motor 44 is coupled to drive movable arm 46 of potentiometer 47 which in turn feeds an error voltage to the differential circuit 43 to complete the loop. The direct current signal proportional to $\theta_2$ is fed to shaping network 48 where it is altered to form a direct current signal proportional to $\tan \theta_2$ as is well known in the art. The resulting signal is applied to cosine potentiometer 49 having its shaft 51 operatively coupled to output shaft 45 of pitch angle servo motor 44 and thus cosine potentiometer 49 has its shaft positioned following angle $\theta_1$ so that the output of cosine potentiometer 49 is a voltage proportional to the product $\tan \theta_2 \cos \theta_1$. This output is fed to a roll angle servo loop 52 which includes a tangent follow-up potentiometer 53 to cause the servo output shaft rotation to generate angle "p." Thus, the output of cosine potentiometer 49 is fed to differential circuit 54 which in turn energizes the roll angle servo motor 55 having output shaft 56 operatively coupled to move the movable arm 57 of tangent potentiometer 53, movable arm 57 in turn feeding the resulting error signal to the differential circuit 54 to complete the servo loop.

It will at first appear that the idea of using a tangent feedback potentiometer in the roll servo loop 52 would be impossible since the tangent of 90° is infinity. However, as will be pointed out in more detail hereinafter, means are provided to limit the maximum measured value of $\theta_2$ to 60° or less; the normal servo inputs and feedback loops are, in accordance with our invention, disconnected when either of the measured angles $\theta_1$ or $\theta_2$ exceeds 60°.

Referring now to FIG. 8, there is shown our complete attitude reference system including the additional circuitry and devices necessary to provide the yaw angle. The yaw angle output is, in accordance with our invention, provided by the directional gyro 58 with a pickoff by means of a suitable synchro generator 59, the output being the angle between the forward vector established by the directional gyro and a reference line on the inner gimbal of the two-gimbal assembly on which the gyro is mounted.

Gyro 58 is a single degree of freedom gyro which will be continuously oriented so that one axis is aligned with the planet vertical reference line. Gyro 58 is provided with two gimbals which allow the gyro to be properly oriented, one gimbal correcting for roll of the vehicle by means of the servo loop 52 described above, and the other gimbal correcting for the pitch of the vehicle by means of the servo loop 42. When the gimbal system is thus driven, inspection of FIG. 6 will clearly indicate that one axis of the gyro will be maintained parallel to the planet vertical, and it will now be seen that the torque due to orbital angular velocity of the vehicle, as indicated by arrow 60 in FIG. 8, will cause the spin axis of the gyro to seek a position at right angles to the orbital plane, thus in turn establishing a reference position from which the vehicle yaw angle can be measured.

Referring now particularly to FIG. 8 in which like elements are indicated by like reference numerals, it will be seen that $\theta_1$ and $\theta_2$ computers 61 and 62 are provided respectively fed by scanners 63 and 64; computing systems 61 and 62 may be as shown in FIG. 4 or as shown in FIGS. 10 and 11 and described hereinafter. Scanners 63 and 64 are preferably incorporated in a single unitary device driven by a single driving motor, such as shown in FIG. 9.

As indicated above, when either of the measured angles $\theta_1$ or $\theta_2$ exceeds a predetermined amount, such as 60°, the normal servo inputs and feedback loops are disconnected. Furthermore, when this occurs, in accordance with our invention, the two servos 42 and 52 are operated from velocity memory devices so that the planet vertical is tracked even when there is no input from the scanners 63 and 64. This is done since one axis of the gyro 58 must be continuously aligned with the planet vertical, and further in order to accommodate a vehicle spin rate sufficiently high that the servo inputs are only present for a few tenths of a second, thus requiring that the servo system error be small when the input information arrives, if the servo is to respond rapidly enough.

In order to provide the disconnection of the servo inputs and feedback loops and the connection in the servo loops of velocity memory devices, the arrangement now to be described is provided. It will be recalled that the outputs of the $\theta_1$ and $\theta_2$ computers 61 and 62 are voltages respectively proportional to the angles $\theta_1$ and $\theta_2$. This being the case, conventional amplitude discriminator circuits 63a and 64a are provided having their inputs respectively connected to the outputs of the $\theta_1$ and $\theta_2$ computers 61 and 62, amplitude discriminators 63a and 64a respectively providing output signals when the voltages impressed thereon are proportional to the angles $\theta_1$ and $\theta_2$ in excess of 60°. The output circuits of amplitude discriminators 63a and 64a are connected to a conventional OR circuit 65 which in turn is connected to actuate relay 66, and it will thus be seen that relay 66 will be actuated when either angle $\theta_1$ or $\theta_2$ is in excess of 60°. Relay 66 in turn actuates contacts 67 and 68 associated with servo loop 42 and contacts 69 and 71 associated with servo loop 52. Thus, when relay 66 is energized, switch 67 disconnects differential circuit 43 of servo loop 42 from the $\theta_1$ computer, and in turn connects differential circuit 43 to the output of memory circuit 72. Likewise, switch 68 disconnects differential circuit 43 from potentiometer 47, and in turn connects tachometer 73 to differential circuit 43 and memory circuit 72, tachometer 73 being operatively driven by the output shaft 45 of servo motor 44. It will now be seen that servo loop 42 is thus effectively reconnected as a rate loop rather than a position loop when relay 66 is energized. Similarly, when relay 66 is energized, switch 69 disconnects differential circuit 54 of the roll servo 52 from cosine potentiometer 49 and in turn connects it to memory circuit 74. Likewise, switch 71 disconnects differential circuit 54 from tangent potentiometer 53 and in turn connects tachometer 75 to differential circuit 54 and memory circuit 74, the tachometer 75 likewise being operatively driven by output shaft 56 of roll servo motor 55. While the velocity memory system for servo loops 42 and 52 has been shown as instrumented by the use of tachometer feedback, it will be readily understood that in the interest of minimizing weight, a differentiator may be employed to derive rate feedback, the output of the differentiator being followed by a memory amplifier until the disconnect circuitry 63 through 66 enable the velocity memory loop. At that time, the memory amplifier will maintain the velocity voltage which is present at the disconnect time, and will compare that voltage with the output of the differentiator; the difference voltage will be the error voltage applied to the servo amplifier and the output shaft will be driven at the proper rate.

As previously suggested, it is seen that the output shaft 45 of servo motor 44 is operatively connected to drive the outer gimbal of gyro 58 while output shaft 56 of roll servo 55 is connected to drive the inner gimbal of gyro 58. Output shaft 45 of pitch servo 44 may also be coupled to drive a synchro transmitter 76 and output shaft 56 of roll servo 55 may be connected to drive synchro transmitter 77.

Shaping network 48 may employ conventional diode shaping techniques to generate tan $\theta_2$, the tangent curve being approximated by a series of line segments with the number of components used to accomplish the shaping being determined by the accuracy required.

Referring now to FIG. 9, in which like elements are indicated by like reference numerals, there is shown a scanning assembly in accordance with our invention, generally indicated at 80, in which the two optical assemblies 64 and 65 are driven at a continuous rate by a single drive motor 17. In order to allow for vehicle spin rates of up to one revolution per second, the optical assemblies may be driven at 200 revolutions per second, and thus motor 17 may be a synchronous, four-pole, 400-cycle motor. Each optical system 64, 65 consists of a flat infra-red reflective scanning mirror 15 mounted in a cylindrical housing 81 at an angle of 45° with respect to its spin axis, each mirror 15 being exposed to opening 82 in its housing. Each scanning mirror 15 thus receives infra-red radiation in its respective scanning plane, as indicated by the dashed lines 83, the radiation then being reflected at right angles to the respective scanning plane through a suitable focusing lens 84 onto the respective infra-red detectors 18a and 18b, detectors 18a and 18b being mounted in a common housing 85, as shown. A suitable optical filter (not shown) may also be provided associated with mirrors 15 and lenses 84, such filters preferably being of the long-wavelength pass type in order to prevent radiation below three microns from reaching the detectors 18. These filters will therefore greatly reduce the direct solar radiation, and thus in turn tend to prevent saturation of the detectors, and furthermore will tend to prevent false signals which might otherwise be provided due to a sudden solar reflection radiant along the planet's surface. The focusing lenses 84 likewise should be formed of a high index of refraction material which is highly transmissive to infrared radiation, such as a germanium element anti-reflection coated to give 94% transmission at four microns, and a calcium fluoride element.

Bevel gears 86 are mounted on the housing members 81 respectively cooperatively meshing with bevel gear 87 driven by motor 17, gears 86 and 87 having a one-to-one gear ratio to provide the 200-cycles per second scan rate. Housings 81 are rotatably supported by gimbal assemblies 88 which in turn are secured to frame 89. Inspection of FIG. 9 will clearly reveal that the spin axes of the housings 81, and thus of the mirrors 15, are disposed at right angles, and thus that the infra-red scanning beams 83 are continuously rotated in scanning planes 1 and 2 respectively. It will further be readily seen that scanning planes 1 and 2 intersect along a line directly in front of the scanning assembly 80, which, as previously indicated is chosen as the vehicle vertical reference line.

Referring now to FIGS. 10 and 11, the preferred system and method for computing the $\theta$ angles is shown. As indicated hereinabove in connection with FIG. 3, $\theta = \frac{1}{2}(\theta_{fs} - \theta_s)$. As in the case of the $\theta$ angle computing system of FIGS. 4 and 5, since the scanning beams rotate at constant angular velocity, angles $\theta_s$ and $\theta_{fs}$ are respectively directly proportional to the times required for the beam to sweep from the vehicle vertical reference line looking upward to the point of initial interception of the beam with the planet, and the time required for the beam to sweep from the point of final departure of the beam from the planet back to the vehicle vertical reference line looking upward to complete 360° of scan. Since, as previously indicated, the index pulses 22 and 23 are respectively spaced 45° on either side of the vehicle vertical reference line looking upward, it will be readily apparent that the time $T_1$ required for the beam to scan from the index pulse 22 to the leading edge of the signal pulse 28 is directly proportional to the angle $\theta_s$ and that the time $T_2$ required for the beam to scan from the trailing edge of the signal pulse 28 to the second impulse 23 likewise will be directly proportional to the angle $\theta_{fs}$.

FIG. 10 shows one $\theta$ angle computing system, generally identified at 91, in which infrared detector 18 is connected to a differentiating circuit 92 while index pulse pick-off 21 is connected to differentiating circuit 93. A pair of bistable multivibrators 94 and 95 are provided, differentiating circuits 92 and 93 being respectively connected to the bistable multivibrators 94 and 95 as shown. Referring now additionally to FIG. 11, it will be seen that differentiating circuit 93 differentiates the index pulses 22 and 23 to provide positive and negative-going pulses 96 and 97 coincident with the leading and trailing edges respectively of the index pulse 22, and positive and negative going pulses 98 and 99 coincident with the leading and trailing edges respectively of the index pulse 23. Likewise, it is seen that differentiating circuit 92 provides positive and negative-going pulses 101 and 102 respectively coincident with the leading and trailing edges of the signal pulse 28. Bistable multivibrator 94 is arranged to be turned on responsive to negative going differentiated pulse 97 from differentiating circuit 93 and to be turned off responsive to positive-going differentiated pulse 101 from differentiating circuit 92, thus providing an output pulse 103 having a duration equal to the time $T_1$ between index pulse 22 and the leading edge of signal pulse 28. Likewise, bistable multivibrator 95 is arranged to be turned on responsive to negative-going pulse 102 provided by differentiating circuit 92 and to be turned off responsive to positive-going differentiated pulse 98 provided by differentiating circuit 93 thus providing pulse 104 equal in duration to time $T_2$. Bistable multivibrator 94 is arranged to provide a positive-going output pulse 103 while bistable multivibrator 95 is arranged to provide a negative-going output pulse 104.

It will now be seen that the output pulses 103 and 104 from the bistable multivibrators 94 and 95 respectively have a duration proportional to angles $\theta_s$ and $\theta_{fs}$. In order to convert pulses 103 and 104 to signals having amplitudes proportional to the angles $\theta_s$ and $\theta_{fs}$, bistable multivibrator 94 is connected to integrating circuit 105 while bistable multivibrator 95 is connected to integrating circuit 106, integrating circuits 105 and 106 in turn being connected to adding circuit 107. Referring again to FIG. 11, it will now be seen that the positive-going pulse 103 from multivibrator 94, when integrated, provides a signal level 108, identified as $+E_1$ while the negative-going pulse 104, when integrated, provides a signal level 109, identified as $-E_2$, it being readily apparent that the signal $+E_1$ is proportional to time $T_1$ and thus in turn to the angle $\theta_s$ while signal $E_2$ is proportional to time $T_2$ and thus in turn to the angle $\theta_{fs}$. Since the signals $+E_1$ and $-E_2$ are respectively positive and negative, they are subtracted in the adding circuit 107 to provide an output signal level 111 which inspection will reveal is directly proportional to twice the desired angle $\theta$. The angle $\theta$ may then be obtained directly by the use of a potentiometer 112.

It will now be seen that our improved system and method for determining the attitude of a space vehicle with reference to a planet not only provides yaw, pitch and roll information, but also orients a gyro with one axis aligned along the vertical line from the center of the planet to the vehicle. The information thus provided by our system as thus far described may be utilized for such purposes as correcting the attitude of the vehicle or for actuating radio transmitting or photographic apparatus at times when the vehicle is suitably oriented with reference to the planet. It will further be readily seen that the scanners 63 and 74 may be servoed so that they continuously track the planet vertical reference line.

Referring now to FIGS. 12 and 13, there is shown the system and method for providing altitude measurement in accordance with our invention. It will be readily comprehended that in the system and method thus far described, the two scanning planes do not, in general intersect the planet center. As a result, the angle subtended by the planet in the scanning plane is not sufficient to define the altitude at all times. It will be readily comprehended, however, that if one of the $\theta$ angles, for example $\theta_1$, goes to zero, i.e., with the planet vertical lying in the plane of the vehicle yaw and pitch axis, the other scanning plane (No. 2) must pass through the center of the planet and thus the included angle $\theta_2$ lies in a plane passing through the center of the planet; angle $\theta_2$ is the angle through which the beam travels while intercepting the planet. The magnitude of the angle $\theta_2$ in plane No. 2 corresponding to time $T$ of FIG. 11, measured at the instant when the angle $\theta_1$ is at zero, and the radius of the planet are then all that is necessary to determine the altitude of the vehicle above the planet. FIG. 12 graphically illustrates the above described condition in which the angle $\theta_1$ is zero. Under these conditions, scanning plane No. 2, being at right angles to scanning plane No. 1 falls on the center of the planet. In FIG. 12, the angle swept out by the scanning beam 2 is identified as "B." Thus it will be readily seen that the angle $\theta_2$, i.e., the angle defined between the planet vertical and the vehicle reference line is exactly half the angle "B," or $B/2$. It will be recognized that with the radius of the planet R being known, and with the radius R defining a right angle with the line defined by the scanning beam when it first intercepts or finally departs from the planet, $R = (h+R) \sin B/2$. Since R is known and the previously described computer systems will provide the angle $B/2$, it will be readily apparent that the equation can be solved for "$h$," thus providing a measurement of the altitude of the vehicle above the surface of the planet.

Referring now additionally to FIG. 13, the system for providing altitude information is shown. Here, input terminal 115 is connected to receive a voltage proportional to the angle $\theta_1$, i.e., as by being connected to the output of the $\theta_1$ computer 61 of FIG. 8 at 116. Likewise, input terminal 117 is connected to receive a voltage proportional to the angle $\theta_2$ as by means being connected to the output of the $\theta_2$ computer 62 at 118 in FIG. 8. Input terminal 119 is connected to receive the detected signal pulses 28 from the $\theta_2$ scanner, as by being connected to the output of $\theta_2$ scanner 64 at 121, and input terminal 122 is connected to receive the detected signal pulses 28 from the $\theta_1$ scanner, as by being connected to the output of the $\theta_1$ scanner 63 at point 123. Input terminals 115 and 117 are respectively connected to voltage comparators 124 and 125, each comparator having a reference voltage input circuit 126 to which a reference voltage of zero is applied, as shown. Thus, the comparators 124 and 125 will respectively provide an output or enabling signal in output circuits 127, 128, so long as the respective angle $\theta_1$ or $\theta_2$ is equal to zero. Input terminals 119 and 122 are connected to differentiating circuits 129 and 131 which in turn are connected to bistable multivibrators 132 and 133 which feed integrating circuits 134 and 135. Thus, the signal pulses 28 applied to the input terminal 119 are differentiated, differentiator 129 thereby triggering bistable multivibrator 132 to provide a square pulse having the same duration as the detected pulses 28 provided by the $\theta_2$ scanner, these pulses being integrated in integrating circuit 134 to provide a voltage $V_2$ proportional to the duration T of the signal pulse 28 from the $\theta_2$ scanner which in turn is proportional to the angle $\theta_2$. Likewise, the output of integrating circuit 135 is a voltage $V_1$ having its amplitude proportional to the duration T of the signal pulse 28 from the $\theta_1$ scanner which in turn is proportional to the angle $\theta_1$. The output circuits of comparator 124 and integrating circuit 134 are connected to gate or "AND" circuit 136 which is arranged to be opened responsive to the enabling signal in the output circuit 127 of comparator 124 to pass the voltage output $V_2$ from integrating circuit 134. Likewise, the output circuits of comparator 125 and integrating circuit 135 are connected to gate or "AND" circuit 137 which is arranged to be opened responsive to the enabling signal from comparator 125 to pass the voltage $V_1$ from integrating circuit 135. Gate circuits 136 and 137 in turn are connected to memory circuit 138.

It will now be seen that the output or enabling voltage from each comparator 124 and 125 enables a sampler which applies a voltage V which is proportional to the angle B to the memory circuit 138 as long as the enabling voltage is present, i.e., so long as the angle $\theta$ of the other scanning plane is zero.

It will now be seen that the output of the memory circuit 138 is a signal having its amplitude proportional to the angle B when either scanning plane 1 or scanning plane 2 is tangent with the earth so that its $\theta$ angle is zero. It will be readily comprehended that a synchro output signal proportional to altitude can be obtained by the use of the circuitry shown connected to the output circuit 139 of the memory circuit 138. The quantity sin B/2 is obtained by a suitable shaping network 141, such as a diode shaping network, connected to the output circuit 139 of memory circuit 138. The product $(h+R)$ sin B/2 is derived from the output of potentiometer 142 which is connected to the output of the shaping network 141. This product is compared with a direct current voltage proportional to R causing a servo loop output shaft to be positioned to correspond to $h+R$. Thus, a servo loop 143 is provided having a differential circuit 144 to which is applied the output from the potentiometer 142 taken from its sliding element 145 and a voltage $V_r$ applied to input terminal 146 which is proportional to R, i.e., the radius of the planet. The result of this comparison is applied to servo motor 147 having its output shaft 148 coupled to drive sliding element 145 of potentiometer 142, thus providing an output shaft position for the servo motor 147 proportional to the quantity $(h+R)$. The altitude "h" can then be readily solved for by the employment of a differential synchro having a shaft input proportional to R in order to provide an output signal having an amplitude proportional to "h." Thus, output shaft 148 of servo motor 147 is also connected to synchro transmitter 149 which is coupled to differential synchro 151, providing a signal proportional to $(h+R)$ thereto. Differential synchro 152 has an input shaft 152 positioned in accordance with R, and thus the output circuit 153 of differential synchro 151 will provide an output voltage $E_h$ which is directly proportional to the altitude "h" of the vehicle above the surface of the planet.

It will now be readily apparent that we have provided an extremely simple system and method of the passive type for determining both the attitude and altitude of a space vehicle with reference to a planet, the system being capable of operating at large altitudes with low power consumption, and being packaged in an extremely small size.

While we have described above the principles of our invention in connection with specific apparatus, it is to be clearly understood that this description is made only by way of example and not as a limitation to the scope of our invention.

What is claimed is:

1. The method of determining the attitude of a space vehicle with reference to a first line extending vertically from the center of a planet to the vehicle comprising the steps of: scanning the planet from said vehicle in two mutually perpendicular planes; and for each scan determining the time interval between the instant when half of a planet scan has occurred and the instant when the scan coincides with the line defined by the intersection of the scanning planes.

2. The method of determining the attitude of a space vehicle with referece to a first line extending vertically from the center of a planet to the vehicle comprising the steps of: generating two search beams extending outwardly from the vehicle and respectively continuously rotating said beams in two planes at right angles with the intersection of said planes coinciding with an arbitrary vertical reference line of the vehicle; generating a signal responsive to interception of each beam by the planet with the signal duration corresponding to the duration of beam interception; and for each beam determining the time interval between the instant at half its signal duration and the instant the beam coincides with said vertical reference line thereby determining the angle between said vertical reference line and a plane containing said first line.

3. The method of determining the attitude of a space vehicle with reference to a first line extending vertically from the center of a planet to the vehicle comprising the steps of: scanning the planet from said vehicle with two search beams in two mutually perpendicular planes; and for each beam measuring the angle through which the beam moves between a reference line and its point of first interception with the planet and the angle through which the beam moves between said reference line and its point of departure from the planet.

4. The method of determining the attitude of a space vehicle with reference to a first line extending vertically from the center of a planet to the vehicle comprising the steps of: simultaneously scanning the planet from said vehicle with two narrow search beams respectively continuously rotating with constant angular velocity in two mutually perpendicular planes; for each beam generating a first signal having an amplitude proportional to the angle through which said beam moves between a reference line defined by the intersection of said scanning planes and the point of its first intersection with said planet, and a second signal having an amplitude proportional to the angle through which said beam moves from said reference line to the point of its departure from the planet; and for each beam adding said first and second signals thereby providing a signal having an amplitude proportional to the angle between said reference line and a line midway between said points of beam interception and departure.

5. The method of determining the attitude of a space vehicle with reference to a first line extending vertically from the center of a planet to the vehicle comprising the steps of: simultaneously scanning the planet from said vehicle with two narrow search beams respectively continuously rotating with constant angular velocity in two mutually perpendicular planes; generating two stepped input signals respectively having durations responsive to scanning of the planet by said beams between lines in the respective scanning plane tangent with the planet; for each beam generating two signals respectively having amplitudes proportional to the time of travel of said beam between its point of coincidence with a reference line defined by the intersection of said scanning planes and said lines of tangency; and for each beam adding said last-named two signals thereby providing an output signal having an amplitude proportional to the angle between said reference line and the instant at half its respective input signal duration.

6. A system for determining the attitude of a space vehicle with reference to a first line extending vertically from the center of a planet to the vehicle comprising: means in said vehicle for scanning the planet in two mutually perpendicular planes and for providing signals respectively responsive thereto; and means cooperating with said scanning means for determining for each scan the time interval between the instant at half the respective signal and the instant when the scan coincides with the line defined by the intersection of the scanning planes.

7. A system for determining the attitude of a space vehicle with reference to a first line extending vertically from the center of a planet to the vehicle comprising: scanning means in said vehicle for generating two narrow search beams and for simultaneously continuously rotating the same with constant angular velocity in two mutually perpendicular planes; means for providing two input signals having widths respectively responsive to interception of said beams by said planet; and means respectively coupled to each of said signal providing means and to said scanning means for providing output signals respectively proportional to the time interval between the instant at half the respective input signal width and the instant the respective beam coincides with the line defined by the intersection of the scanning planes.

8. A system for determining the attitude of a space vehicle with reference to a first line extending vertically from the center of a planet to the vehicle comprising: first and second scanning means in said vehicle for generating two narrow search beams and for simultaneously continuously rotating the same with constant angular velocity in two mutually perpendicular planes; means respectively responsive to said beams for generating two stepped signals having widths responsive to interception by said planet of said beams; means respectively coupled to each of said scanning means for providing index signals at instants when the respective beam bears a predetermined angular relation on either side of the line defined by the intersection of said scanning planes; and computing means coupled to respective stepped signal producing means and index signal providing means for providing output signals having amplitudes respectively proportional to the time interval between the instant at half the respective input signal width and the instant when the respective beam coincides with said scanning plane intersection line in the direction of the planet.

9. A system for determining the attitude of a space vehicle with reference to a first line extending vertically from the center of a planet to the vehicle comprising: first and second means in said vehicle for scanning the planet with two search beams in mutually perpendicular planes, said scanning means including means for respectively detecting the points at which each beam first intercepts and again departs from the planet; and means coupled to each of said detecting means for respectively measuring the angles through which each beam moves between the line defined by the intersection of said planes and said points of interception and departure.

10. A system for determining the attitude of a space vehicle with reference to a first line extending vertically from the center of a planet to the vehicle comprising: first and second means in said vehicle for scanning the planet with two search beams in mutually perpendicular planes; first and second means respectively coupled to said scanning means for respectively detecting the points when each beam first intercepts and again departs from the planet and for providing a stepped signal having a width proportional to the time interval between said points; and a pair of computing means respectively coupled to said detecting means; each of said computing means including means for generating two signals having amplitudes respectively proportional to the time of travel of said beam between a reference line defined by the intersection of said planes and said points of beam interception and departure, and means for adding said last-named two signals to provide an output signal having an amplitude proportional to the angle between said reference line and a line bisecting the angle through which said beam moves between said points of interception and departure.

11. A system for determining the attitude of a space vehicle with reference to a first line extending vertically from the center of a planet to the vehicle comprising: first and second scanning means in said vehicle for generating two narrow search beams and for simultaneously continuously rotating the same with constant angular velocity in two mutually perpendicular planes; and a pair of computing means respectively coupled to said scanning means for computing the angle through which each beam moves between a line midway between its point of initial interception of the planet and its point of final departure from the planet and a second line defined by the intersection of said planes; each of said computing means comprising means responsive to the respective beam for generating a stepped signal having a width responsive to the beam intercepting the planet, means coupled to the respective scanning means for providing first and second index pulses responsive to the respective beam sequentially passing first and second points equally angularly spaced on either side of the line defined by the intersection of said planes, means coupled to said index pulse providing means for providing a ramp voltage responsive to the first index pulse which terminates short of the second index pulse, said ramp voltage going from one polarity to the opposite polarity and passing through zero at the point when the respective beam is coincident with said second line, means for measuring said ramp voltage at the leading edge of said stepped signal, means for measuring said ramp voltage at the trailing edge of said stepped signal, and means for adding the thus measured voltages.

12. A system for determining the attitude of a space vehicle with reference to a first line extending vertically from the center of a planet to the vehicle comprising: first and second scanning means in said vehicle for generating two narrow search beams and for simultaneously continuously rotating the same with constant angular velocity in two mutually perpendicular planes; and a pair of computing means respectively coupled to said scanning means for computing the angle through which each beam moves between a line midway between the point of its initial interception of the planet and its final departure from the planet and a second line defined by the intersection of said planes; each of said computing means comprising means responsive to the respective beam for generating a stepped signal having a width responsive to the beam intercepting the planet, means coupled to the respective scanning means for providing first and second index pulses responsive to the respective beam sequentially passing first and second points equally angularly spaced on either side of the line defined by the intersection of said planes, gate pulse generating means coupled to said first index pulse generating means for providing a gate pulse responsive to said first index pulse and terminating short of said second index pulse, ramp voltage generating means coupled to said gate pulse generating means for providing a ramp voltage responsive to said gate pulse and coincident therewith which goes from one polarity to the other passing through zero at the point when the respective beam is coincident with said second line and directed toward the planet, switching means coupled to said ramp voltage generating means and said stepped signal generating means for passing a first sample of said ramp voltage coincident with the leading edge of said stepped voltage and a second sample of said ramp voltage coincident with the trailing edge of said stepped voltage, memory means, second switching means coupled to said first switching means for passing said first sample voltage to said memory means, and an output circuit including adding means coupled to said memory means and said second switching means, said second switching means passing said second sample voltage to said adding means whereby said first and second voltages are added to provide an output voltage proportional to said angle.

13. The combination of claim 7 in which said scanning means comprises two infra-red reflective scanning mirrors and means for continuously rotating the same thereby respectively to scan in said two planes, and said input signal providing means comprises two infra-red detectors respectively disposed to receive infra-red radiation from said mirrors thereby respectively providing said input signals when said mirrors are scanning the planet.

14. The combination of claim 10 further comprising means coupled to one of the computing means for modifying the output signal provided thereby to be proportional to the tangent of the respective angle, means coupled to the other of said computing means for modifying the output signal provided thereby to be proportional to the cosine of the respective angle; and means coupling said modifying means for performing a multiplication operation on their respective output voltages.

15. The combination of claim 10 further comprising a first servo loop coupled to one of said computing means and responsive to the output signal provided thereby for providing a shaft rotation proportional to one respective angle thereby providing the pitch angle of said vehicle with respect to said first line, means coupled to the other of said computing means for modifying the output signal provided thereby to be proportional to the tangent of the other respective angle, a cosine potentiometer having its shaft coupled to follow the output of said first servo loop and coupled to said modifying means thereby performing the operation of multiplying the cosine of said one angle by the tangent of said other angle, and another servo loop including a tangent feedback differentially coupled to the output of said cosine potentiometer for providing a shaft rotation proportional to the roll angle of said vehicle with respect to said first line.

16. The combination of claim 10 further comprising a first servo loop coupled to one of said computing means and responsive to the output signal provided thereby for providing a shaft rotation proportional to one respective angle thereby providing the pitch angle of said vehicle with respect to said first line, means coupled to the other of said computing means for modifying the output signal provided thereby to be proportional to the tangent of the other respective angle, a cosine potentiometer having its shaft coupled to follow the output of said first servo loop and coupled to said modifying means thereby performing the operation of multiplying the cosine of said one angle by the tangent of said other angle, another servo loop including a tangent feedback differentially coupled to the output of said cosine potentiometer for providing a shaft rotation proportional to the roll angle of said vehicle with respect to said first line, and a single degree of freedom gyro having one gimbal coupled to said first servo loop and positioned responsive to the output shaft position thereof and having its other gimbal coupled to said other servo loop and positioned responsive to the output shaft position thereof, thereby maintaining one axis of the gyro aligned with said first line whereby the torque due to orbital angular velocity of the vehicle causes the spin axis of the gyro to be positioned at right angles to the orbital plane to thereby provide the yaw angle of the vehicle with reference to the orbital plane.

17. The combination of claim 10 further comprising a first servo loop coupled to one of said computing means and responsive to the output signal provided thereby for providing a shaft rotation proportional to one respective angle thereby providing the pitch angle of said vehicle with respect to said first line, means coupled to the other of said computing means for modifying the output signal provided thereby to be proportional to the tangent of the other respective angle, a cosine potentiometer having its shaft coupled to follow the output of said first servo loop and coupled to said modifying means thereby performing the operation of multiplying the cosine of said one angle by the tangent of said other angle, another servo loop including a tangent feedback differentially coupled to the output of said cosine potentiometer for providing a shaft rotation proportional to the roll angle of said vehicle with respect to said first line, and means respectively coupled to said computing means for respectively disconnecting the same from said servo loops when either said one or other angle exceeds a predetermined amount.

18. The combination of claim 10 further comprising a first servo loop coupled to one of said computing means and responsive to the output signal provided thereby for providing a shaft rotation proportional to one respective angle thereby providing the pitch angle of said vehicle with respect to said first line, means coupled to the other of said computing means for modifying the output signal provided thereby to be proportional to the tangent of the other respective angle, a cosine potentiometer having its shaft coupled to follow the output of said first servo loop and coupled to said modifying means thereby performing the operation of multiplying the cosine of said one angle by the tangent of said other angle, another servo loop including a tangent feedback differentially coupled to the output of said cosine potentiometer for providing a shaft rotation proportional to the roll angle of said vehicle with respect to said first line, means respectively coupled to said computing means for respectively disconnecting the same from said servo loops when either said one or other angle exceeds a predetermined amount, and velocity memory means for each of said servo loops, said disconnecting means respectively connecting said velocity memory means in each of said servo loops when said angles exceed said predetermined amount.

19. The combination of claim 10 in which said scanning means comprises two infra-red reflective scanning mirrors and means for continually rotating the same respectively to scan in said two planes, and in which said beam responsive means comprises two infra-red detectors respectively disposed to receive infra-red radiation from said mirrors thereby respectively providing said stepped signals when said mirrors are scanning said planet, and further comprising: a first servo loop having its input circuit coupled to the output circuit of one of said computing means and having an output shaft for providing an output shaft rotation proportional to one respective angle thereby providing the pitch angle of said vehicle with respect to said first line, a shaping network coupled to the output circuit of the other of said computing means for modifying the output voltage provided thereby to be proportional to the tangent of the other respective angle, a cosine potentiometer having its shaft coupled to the output shaft of said first servo loop and following the same and coupled to said shaping network thereby performing the operation of multiplying the cosine of said one angle and the tangent of said other angle to provide a voltage proportional to the roll angle of said vehicle with respect to said one line, another servo loop having its input circuit coupled to said cosine potentiometer and having an output shaft, said other servo loop having a tangent potentiometer in its feedback circuit whereby said other servo loop provides an output shaft rotation proportional to said roll angle, a single degree of freedom gyro having its outer gimbal connected to the output shaft of said one servo loop and positioned thereby and having its inner gimbal connected to the output shaft of the other servo loop and positioned thereby so that one axis of said gyro is maintained in alignment with said first line whereby the torque due to orbital velocity of said space vehicle causes the spin axis of the gyro to be positioned at right angles to the orbital plane of the vehicle to thereby provide the yaw angle of the vehicle with reference to the orbital plane, a pair of amplitude discriminating means respectively coupled to the output circuits of said computing means for detecting when the respective angles exceed a predetermined amount, third switching means coupled to said amplitude discriminating means and to both of said servo loops for disconnecting the same from said computing means responsive to either angle exceeding said predetermined amount, and a pair of velocity memory means, said third switching means respectively connecting said velocity memory means in each of said servo loops responsive to said angles exceeding said predetermined amount.

20. A system for determining the attitude of a space vehicle with reference to a first line extending vertically from the center of a planet to the vehicle comprising: first and second scanning means in said vehicle for generating two narrow search beams and for simultaneously continuously rotating the same with constant angular velocity in two mutually perpendicular planes; and a pair of computing means respectively coupled to said scanning means for computing the angle through which each beam moves between a line midway between its point of initial interception of the planet and its point of final departure from the planet and a second line defined by the intersection of said planes; each of said computing means comprising means responsive to the respective beam for generating a stepped signal having a width proportional to the beam intercepting the planet, means coupled to the respective scanning means for providing first and second index pulses responsive to the respective beam sequentially passing first and second points equally angularly spaced on either side of the line defined by the intersection of said planes, means coupled to said index pulse providing means and said stepped signal generating means for providing a first signal having an amplitude proportional to the time interval between the first index pulse and the leading edge of said stepped signal and a second signal having an amplitude proportional to the time interval between the trailing edge of said stepped signal and the second index pulse, and means for adding said last-named first and second signals.

21. A system for determining the attitude of a space vehicle with reference to a first line extending vertically from the center of a planet to the vehicle comprising: first and second scanning means in said vehicle for generating two narrow search beams and for simultaneously continuously rotating the same with constant angular velocity in two mutually perpendicular planes; and a pair of computing means respectively coupled to said scanning means for computing the angle through which each beam moves between a line midway between its point of initial interception of the planet and its point of final departure from the planet and a second line defined by the intersection of said planes; each of said computing means comprising means responsive to the respective beam for generating a stepped signal having a width proportional to the beam intercepting planet, means coupled to the respective scanning means for providing first and second index pulses responsive to the respective beam sequentially passing first and second points equally angularly spaced on either side of the line defined by the intersection of said planes, means coupled to said stepped signal generating means for differentiating said stepped signal, means coupled to said index pulse providing means for differentiating said index pulses, first bistable multivibrator means coupled to said differentiating means for providing a first pulse of one polarity having a width proportional to the first time interval between the first index pulse and the leading edge of said stepped signal, second bistable multivibrator means coupled to said differentiating means for providing a second pulse of the opposite polarity having a width proportional to the second time interval between the trailing edge of said stepped signal and the second index pulse, means coupled to each of said bistable multivibrator means for respectively integrating said first and second pulses thereby providing first and second signals respectively having amplitudes proportional to said first and second time intervals, and means coupled to said integrating means for adding said first and second signals.

22. The combination of claim 10 further comprising: means for determining the altitude of said vehicle above said planet including first and second conversion means for respectively providing an output signal proportional to duration of the stepped signal provided by one beam when the output signal from the adding means associated with the other beam is zero.

23. The combination of claim 10 further comprising: means for determining the altitude of said vehicle above said planet including first and second conversion means, each of said conversion means being coupled to one of said detecting means and to the computing means associated with the other detecting means and providing an output signal having an amplitude proportional to the duration of the respective stepped signal when the output signal from the respective computing means is substantially zero.

24. The combination of claim 10 further comprising: means for determining the altitude of said vehicle above said planet including first and second comparator means respectively coupled to said computing means for respectively providing enabling signals when the respective computing means output signal is substantially zero, first and second converting means coupled to said detecting means for providing output signals respectively having an amplitude proportional to the duration of the respective stepped signal, first gating means coupling the one comparator means associated with one detecting means and the one converting means associated with the other detecting means for passing the output signal thereof responsive to the respective enabling signal, and second gating means coupling the other comparator means and the other converting means for passing the output signal thereof responsive to the respective enabling signal.

25. The combination of claim 10 further comprising: means for determining the altitude of said vehicle above said planet including first and second comparator means respectively coupled to said computing means for respectively providing enabling signals when the respective computing means output signal is substantially zero, first and second converting means coupled to said detecting means for providing output signals respectively having an amplitude proportional to the duration of the respective stepped signal, first gating means coupling the one comparator means associated with one detecting means and the one converting means associated with the other detecting means for passing the output signal thereof responsive to the respective enabling signal, second gating means coupling the other comparator means and the other converting means for passing the output signal thereof responsive to the respective enabling signal and memory means coupled to said first and second gating means.

26. The combination of claim 10 further comprising: means for determining the altitude of said vehicle above said planet including first and second comparator means respectively coupled to said computing means for respectively providing enabling signals when the respective computing means output signal is substantially zero, first and second converting means coupled to said detecting means for providing output signals respectively having an amplitude proportional to the duration of the respective stepped signal, first gating means coupling the one comparator means associated with one detecting means and the one converitng means associated with the other detecting means for passing the output signal thereof responsive to the respective enabling signal, second gating means coupling the other comparator means and the other converting means for passing the output signal thereof responsive to the respective enabling signal memory means coupled to said first and second gating means; first modifying means coupled to said memory means for performing the operation sin $B/2$ where "B" is the output signal from said memory means; variable modifying means coupled to said first modifying means for performing the operation $(h+R)$ sin $B/2$ where "h" is the altitude of the vehicle and "R" is the radius of the planet; and a servo loop having an output shaft and an input circuit and including means coupled to said variable modifying means for comparing the output signal thereof with a signal proportional to "R," said variable modifying means being coupled to follow the output shaft portion of said servo loop whereby said output shaft position corresponds to $(h+R)$.

27. The combination of claim 10 further comprising: means for determining the altitude of said vehicle above said planet including first and second comparator means respectively coupled to said computing means for respectively providing enabling signals when the respective computing means output signal is substantially zero, first and second converting means coupled to said detecting means for providing output signals respectively having an amplitude proportional to the duration of the respective stepped signal, first gating means coupling the one comparator means associated with one detecting means and the one converting means associated with the other detecting means for passing the output signal thereof responsive to the respective enabling signal, second gating means coupling the other comparator means and the other converting means for passing the output signal thereof responsive to the respective enabling signal; memory means coupled to said first and second gating means; first modifying means coupled to said memory means for performing the operation sin $B/2$ where "B" is the output signal from said memory means; variable modifying means coupled to said first modifying means for performing the operation $(h+R)$ sin $B/2$ where "h" is the altitude of the vehicle and "R" is the radius of the planet; a servo loop having an output shaft and an input circuit including means coupled to said variable modifying means for comparing the output signal thereof with a signal proportional to "R," said variable modifying means being coupled to follow the output shaft position of said servo loop whereby said output shaft portion corresponds to $(h+R)$; and a differential synchro coupled to said servo loop output shaft and having an input shaft positioned proportional to "R" thereby providing an output signal proportional to "h."

No references cited.